(12) United States Patent
Schanz (10) Patent No.: US 10,986,301 B1
(45) Date of Patent: Apr. 20, 2021

(54) PARTICIPANT OVERLAY AND AUDIO PLACEMENT COLLABORATION SYSTEM PLATFORM AND METHOD FOR OVERLAYING REPRESENTATIONS OF PARTICIPANTS COLLABORATING BY WAY OF A USER INTERFACE AND REPRESENTATIONAL PLACEMENT OF DISTINCT AUDIO SOURCES AS ISOLATED PARTICIPANTS

(71) Applicant: Holger Schanz, Rancho Mission Viejo, CA (US)

(72) Inventor: Holger Schanz, Rancho Mission Viejo, CA (US)

( * ) Notice: Subject to any disclaimer, the term of this patent is extended or adjusted under 35 U.S.C. 154(b) by 0 days.

(21) Appl. No.: 16/829,240

(22) Filed: Mar. 25, 2020

Related U.S. Application Data (60) Provisional application No. 62/823,818, filed on Mar. 26, 2019.

(51) Int. Cl.
| | |
|---|---|
| *H04N 7/15* | (2006.01) |
| *H04N 5/445* | (2011.01) |
| *H04S 7/00* | (2006.01) |
| *H04S 3/00* | (2006.01) |
| *G10L 19/008* | (2013.01) |

(52) U.S. Cl.
CPC ....... *H04N 5/44504* (2013.01); *G10L 19/008* (2013.01); *H04N 7/15* (2013.01); *H04S 3/008* (2013.01); *H04S 7/303* (2013.01); *H04S 2400/01* (2013.01); *H04S 2400/11* (2013.01)

(58) Field of Classification Search
CPC .. H04N 5/445; H04N 7/15; H04S 7/00; H04S 3/00
USPC ............................................. 348/14.01–14.16
See application file for complete search history.

(56) References Cited

U.S. PATENT DOCUMENTS

| | | | | |
|---|---|---|---|---|
| 2009/0070688 | A1* | 3/2009 | Gyorfi ...................... | H04N 7/15 715/758 |
| 2011/0103624 | A1* | 5/2011 | Ferren .................... | H04N 7/142 381/306 |
| 2011/0283008 | A1* | 11/2011 | Smelyansky ............ | H04N 7/15 709/231 |
| 2014/0184721 | A1* | 7/2014 | Zhang ..................... | G06F 3/048 348/14.02 |
| 2016/0073055 | A1* | 3/2016 | Marsh .................... | H04N 7/152 348/14.08 |

(Continued)

*Primary Examiner* — Melur Ramakrishnaiah (57) ABSTRACT

A participant overlay and audio placement collaboration system platform and a method for overlaying participants collaborating via a user interface and placement of distinct audio sources are disclosed. The participant overlay and audio placement collaboration system platform provides an ergonomic and intuitive sense-oriented user interface that separates presenters/speakers relevant video contents from irrelevant surroundings and visually overlays the presenter with the presented material, thereby allowing for a more immersive, intuitive, and interactive presentation, while maximizing usage of desktop space for shared/presented content and of the presenter(s) themselves. The further correlation of audio-mapping of acoustic content of presenter(s)/participant(s) relative to their visual representation on the desktop, allows for a significantly improved audio experience and separation capability of different speakers and relevant speakers audio from nuisance background sounds.

10 Claims, 4 Drawing Sheets

(56) References Cited

U.S. PATENT DOCUMENTS

2017/0187966 A1* 6/2017 Getting .................. G06F 3/013
2017/0353694 A1* 12/2017 Yoakum ................. G06F 3/165

* cited by examiner

PARTICIPANT OVERLAY AND AUDIO PLACEMENT COLLABORATION SYSTEM PLATFORM AND METHOD FOR OVERLAYING REPRESENTATIONS OF PARTICIPANTS COLLABORATING BY WAY OF A USER INTERFACE AND REPRESENTATIONAL PLACEMENT OF DISTINCT AUDIO SOURCES AS ISOLATED PARTICIPANTS

CLAIM OF BENEFIT TO PRIOR APPLICATION

This application claims benefit to U.S. Provisional Patent Application 62/823,818, entitled "PARTICIPANT OVERLAY AND AUDIO PLACEMENT COLLABORATION SYSTEM PLATFORM AND METHOD FOR OVERLAYING REPRESENTATIONS OF PARTICIPANTS COLLABORATING BY WAY OF A USER INTERFACE AND REPRESENTATIONAL PLACEMENT OF DISTINCT AUDIO SOURCES AS ISOLATED PARTICIPANTS," filed Mar. 26, 2019. The U.S. Provisional Patent Application 62/823,818 is incorporated herein by reference.

BACKGROUND

Embodiments of the invention described in this specification relate generally to participant isolation and representation during collaborative presentation, and more particularly, to a participant overlay and audio placement collaboration system platform and a method for overlaying participants collaborating via a user interface and representational placement of distinct audio sources as isolated participants.

The existing conventional collaboration systems available today typically separate shared content to be collaborated with from video feed(s) of the collaborators, which is typically presented in a square live video window, with one or multiple windows in various window arrangements 'competing' over the available desktop space to either show the presenter's and audience's video feeds versus the presented/shared materials.

The problem with this approach is, that the shared content is typically just using a fraction of the available desktop space, to allow the video feed display in one or multiple rectangular shaped video windows, taking up a large portion of the available desktop space. While existing video collaboration/conferencing options allow the user to scale shared contents versus the presenter's and other participants views, the contents and video are distinctively separated, resulting in either good views of the shared material or good views of the video feeds, but never both. Also, due to that separated organization of content versus participants, the presenter/participants cannot 'visually interact' with the shared content.

Another shortcoming of current collaboration/video conferencing systems is the poor audio mixing abilities, meaning all audio feeds are plainly added together to one combined audio signal, which in larger groups tends to result in indistinguishable audio-presence of speakers, making it very difficult for the listeners to distinguish different speakers or separate the current speaker from other communication/noises in the background.

Today's collaboration systems, typically video conferencing with documents/screen sharing, separate shared content (in one rectangular window space) from the presenters/participants video feeds (in another one or multiple separated rectangular video feed windows). This therefore requires software and/or the user to arrange and prioritize shared contents over participants video feeds. This only allows for one primary use of the available desktop space, either contents or participants, or both are compromised to allow both at the same time. Also, typical video feeds contain a large amount of unnecessary contents of background visuals of the participants surroundings, without any value add to conversation/collaboration, just cluttering up valuable screen space. Besides that, the simple mixing of all audio signals to one indistinguishable audio stream, makes it very difficult for the listeners to acoustically separate speakers and/or separate background noises from the actual speakers voice.

Therefore, what is needed is a way to separate presenters/speakers relevant video contents (head, body, etc.) from the irrelevant surrounding and visually overlaying the presenter with the presented material (similar to weatherman presenting weather on TV), and to allow for a more immersive and interactive presentation, while maximizing use of the available desktop space for shared/presented content and also allowing for maximized visualization of the presenter(s) themselves, in addition to correlating spoken or other audible content by audio-mapping of acoustic content of presenter(s)/participant(s) relative to their visual representation on the desktop, thereby allowing for a significantly improved audio experience and separation capability of different speakers and relevant speakers audio from nuisance background sounds.

BRIEF DESCRIPTION

A novel participant overlay and audio placement collaboration system platform and a method for overlaying participants collaborating via a user interface and representational placement of distinct audio sources as isolated participants are disclosed. In some embodiments, the participant overlay and audio placement collaboration system platform isolates individual participants and allows individualized representation of participants from a receiving perspective. In some embodiments, the participant overlay and audio placement collaboration system also separates video of a presenter from irrelevant surroundings about the presenter and visually overlays the presenter with the presented material. In some embodiments, the participant overlay and audio placement collaboration system platform maximizes usage of desktop space for shared/presented content and of all the presenter(s) themselves. In some embodiments, the participant overlay and audio placement collaboration system platform and the method for overlaying participants collaborating via the user interface and placement of distinct audio sources further correlates audio-mapping of acoustic content of the presenter relative to the presenter's visual representation on the desktop.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel participant overlay and audio placement collaboration system platform and a method for overlaying participants collaborating via a user interface and representational placement of distinct audio sources as isolated participants. In some embodiments, the participant overlay and audio placement collaboration system platform provides an ergonomic and intuitive sense-oriented user interface that isolates individual participants and allows individualized representation of participants from a receiving perspective. In some embodiments, the participant overlay and audio placement collaboration system also separates video of a presenter from irrelevant surroundings about the presenter and visually overlays the presenter with the presented material. As such, the participant overlay and audio placement collaboration system provides a platform that is immersive, intuitive, and interactive in relation to a presentation with multiple distinct participants associated with different audio and/or video channels, while maximizing usage of desktop space for shared/presented content and of all the presenter(s) themselves.

In some embodiments, the participant overlay and audio placement collaboration system platform and the method for overlaying participants collaborating via a user interface and representational placement of distinct audio sources as isolated participants further correlates audio-mapping of acoustic content of the presenter relative to the presenter's visual representation on the desktop. By mapping the acoustic content and separating different speakers and relevant speakers audio from nuisance background sounds, the participant overlay and audio placement collaboration system platform and the method for overlaying participants collaborating via a user interface and representational placement of distinct audio sources as isolated participants allows for a significantly improved audio experience.

In some embodiments, participant overlay and audio placement collaboration system platform comprises (i) a participant visual isolation module that performs pre-processing and isolates audio associated with individual participants when there is a plurality of participants for a given collaboration, (ii) an audio/visual isolation and relation module that links each isolated visual participant representation to a corresponding isolated audio channel for the participant, (iii) an audio placement compute module that separates audible sound content from individual isolated collaborators and maps the separated audible sound content to audio channels that are placed according to isolated visual representations of the individual collaborators, (iv) a user participant audio/visual collaboration system target client compute module that receives information from the audio/visual isolation and relation module to spatially represent isolated visual representations of participants and direct corresponding audio output to emit from a relative spatial area that corresponds with the isolated visual representation of the participant providing audio, and (v) a participant overlay and audio placement collaboration server to which client computing devices and presenter computing devices connect in relation to a collaborative audio/visual presentation, wherein the audio placement compute module directs audio channels according to visual layout of associated presenting collaborators.

In some embodiments, the participant overlay and audio placement collaboration server is a cloud-based server that hosts a participant overlay and audio placement collaboration cloud application software-as-a-service (SaaS service). In some embodiments, the participant visual isolation module is a participant visual isolation cloud compute module that runs as a service layer of the participant overlay and audio placement collaboration cloud application SaaS service. In some embodiments, the audio/visual isolation and relation module runs on a participant computing device and uploads the linked isolated visual participant representation and corresponding isolated audio channel for the participant to the participant overlay and audio placement collaboration cloud application SaaS service hosted by the cloud-based participant overlay and audio placement collaboration server. In some embodiments, the audio placement compute module is an audio placement cloud compute module that runs as a service layer of the participant overlay and audio placement collaboration cloud application SaaS service.

In some embodiments, the method for overlaying participants collaborating via a user interface and representational placement of distinct audio sources as isolated participants comprises (i) capturing a user source scene video, (ii) capturing a user source scene audio, (iii) receiving a content item selection, (iv) performing a plurality of source scene processing operations on the user source scene video and the user source scene audio, (v) preparing the received content item for collaboration as a shared content item, and (vi) visually presenting the shared content item with overlays of processed user source scene video and mappings of an audio channel for the processed user source scene audio. In some embodiments, the plurality of source scene processing operations comprises a background subtraction operation that removes a background scene from the user source scene video. In some embodiments, the background subtraction results in a user only video that is overlaid on the shared content item during visual presentation. In some embodiments, the plurality of source scene processing operations comprises a sound encoding operation that maps an audio channel to the user only video that is overlaid on the shared content item during visual presentation. In some embodiments, the method for overlaying participants collaborating via a user interface and representational placement of distinct audio sources as isolated participants further comprises performing screen overlay arrangement of a plurality of user only videos that are overlaid and arranged on the shared content item during visual presentation. In some embodiments, the method for overlaying participants collaborating via a user interface and representational placement of distinct audio sources as isolated participants further comprises performing spatial sound arrangement of a plurality of user source scene audio channels that are connected to the plurality of user only videos, said spatial sound arrangement mapping the arrangement of the user only videos to the location of the corresponding user source scene audio.

While today's collaboration systems, like Webex, Bluejeans, GoToMeeting, etc., clearly separate shared content to be collaborated with (documents, presentations, etc.) from the video feed(s) of the collaborators, which are typically presented in a square live video window, with one or multiple windows in various window arrangements 'competing' over the available desktop space to either show the presenter's and audience's video feeds versus the presented/shared materials, problems remain in this approach. Specifically, this approach is problematic in that the shared content is typically just using a fraction of the available desktop space, to allow the video feed display in one or multiple rectangular shaped video windows, taking up a large portion of the available desktop space. While advanced video collaboration/conferencing solutions allow the user to scale the share contents versus the presenters and other participants' views, the contents and video are distinctively separated and either there are good views of the presented/shared material or the presenters/participants video feeds, but never both. Also, due to that separated organization of contents versus participants, the presenter/participants cannot 'visually interact' with the shared contents, like pointing to areas of the shared contents or arrange themselves around the presented contents for better presentation purposes.

Further problems with existing collaboration/video conferencing systems relate to poor audio mixing abilities, whereby all audio feeds are simply added together to one combined audio signal, which can lead to confusion in larger groups with multiple speakers, making it difficult for listeners to distinguish different speakers or separate the current speaker from other communication/noises in the background.

Existing collaboration software systems or the users interacting with them are left to arrange and prioritize shared contents over participants video feeds. This only allows for one primary use of the available desktop space, either contents or participants, or both are compromised to allow both at the same time. Also, typical video feeds include a lot of background visuals of the surroundings, which do not add value to conversation/collaboration, but which use valuable screen space. Besides that, the simple mixing of all audio signals to one indistinguishable audio stream, makes it very difficult for the listeners to acoustically separate speakers and/or separate background noises from the actual speakers voice.

Embodiments of the participant overlay and audio placement collaboration system platform and method for overlaying participants collaborating via a user interface and representational placement of distinct audio sources as isolated participants described in this specification solve such problems by isolating audio and representational imagery of distinct participants and by using 'green screening' technology (by actual green screen or software based foreground separation), where collaboration/video conferencing participants bodies (any or all visual body parts including head, body, limbs, etc.) get separated from usually unnecessary background imagery and overlaid to the shared/presented material, similar to a weatherman presenting the weather on TV, and audio gets output from relative nearby location of associated participants, such that any participant who is a presenter becomes part of the presentation (graphically overlaid on the contents being shared), and all viewing participants can easily and intuitively assess distinct audio contributions as coming from distinct participants in a sense-based audible manner that is supported by an intuitive visual layout of participant representations. In this way, the shared contents fill up the entire or at least very large portion of the available desktop space, while the presenter only occupies a smaller, definable fraction of the desktop space, and viewing participants can keep track of who is contributing. Also, by overlaying the presenter with the presented content, the presenter can interact with the content (point or otherwise) to allow for a better, more comprehensible presentation, all while isolating the presenter from representations of other participants. By way of user controls or intelligent gesture recognition, further interaction modes are possible, including, for example, by automatically or manually visually slanting the presentation content slightly, allowing the presenter to be visualized slightly beside the contents in a virtual 3D arrangement, which then allows the presenter to face the contents and point to various parts of the presented contents, slightly overlapping it but not covering, thereby allowing for considerable interaction between presenter and presented material. Similarly, audio isolation and association with representational imagery of participants is supported, such that audio from a particular relative location is associated with a representation of a participant who is a presenter speaking or otherwise providing some audio content or feedback for viewing and listening participants.

By further taking into account visual location of presenters and participants on the users' desktop, relative to the available screen space or presented material and 3D audio-mapping of the various audio feeds into a correctly correlating audio-space, the participant overlay and audio placement collaboration system platform and method for overlaying participants collaborating via a user interface and representational placement of distinct audio sources as isolated participants allows the listeners to not only visually separate, but also acoustically separate, different speakers and relevant presenters audio from nuisance background communication or other sounds.

The participant overlay and audio placement collaboration system platform and method for overlaying participants collaborating via a user interface and representational placement of distinct audio sources as isolated participants of the present disclosure may be comprised of the following elements. This list of possible constituent elements is intended to be exemplary only and it is not intended that this list be used to limit the participant overlay and audio placement collaboration system platform and method for overlaying participants collaborating via a user interface and representational placement of distinct audio sources as isolated participants of the present application to just these elements. Persons having ordinary, skill in the art relevant to the present disclosure may understand there to be equivalent elements that may be substituted within the present disclosure without changing the essential function or operation of the participant overlay and audio placement collaboration system platform and method for overlaying participants collaborating via a user interface and representational placement of distinct audio sources as isolated participants.

1. Presenter/participants shared contents client source side.
2. Presenter/participants video/audio client source side pre-processed and separated by individual participants in case of multiple participants per client source.
3. Cloud based collaboration platform system.
4. User/participants visual/audio collaboration system client receive side.

The various elements of the participant overlay and audio placement collaboration system platform and method for overlaying participants collaborating via a user interface and representational placement of distinct audio sources as isolated participants of the present disclosure may be related in the following exemplary fashion. It is not intended to limit the scope or nature of the relationships between the various elements and the following examples are presented as illustrative examples only. Items #1 and #2 correlate to each participant's input (sharing portion, shared content, shared material, etc.) to the collaboration system, with item #1 being a feed for the shared content (typically a screen sharing) together with item #2 a video feed (i.e., an audio/visual stream) from the participants video camera. Note that item #2 can be an audio-only feed, such as when a pickup microphone is engaged instead of a video camera to capture a live feed as an audio stream.

In an optimal setup, the participants video feed will be pre-processed to only transmit the participants/presenters themselves (head, body, etc.) without their surroundings. In the case of multiple participants, the each participant will be separated as individual participant with its cropped presence or that task could be taken over by the cloud processing system (item #3) depending on available data bandwidth and processing power of the presenter's side. The cloud collaboration platform system (item #3) is responsible for creating the collaboration platform, allowing at least two or more participants collaboration and sharing each other's video/audio and shared contents to all participants' client sides.

The participants client side #4 is each collaborating parties audio visual output side, responsible to present the shared content and overlaid presenters/participants 'green screened' video sources and acoustically mix audio streams in virtual audio space, corresponding to visual presentation on client side desktop output. To optimize, visual and audio mixing could also take place on the cloud side, based on data bandwidth and client processing performance or where individualized receive side arrangements are either not required or wished, for example, in particularly one-directional addressing, such as class-room style or larger 1-to-N speaker versus audience settings.

The participant overlay and audio placement collaboration system platform and method for overlaying participants collaborating via a user interface and representational placement of distinct audio sources as isolated participants of the present disclosure generally works by the #1 client source side content sharing is typically a classic screen sharing feed, send to #3 the cloud based collaboration platform system, which manages the sharing of content among the collaboration session participants. The #2 client source side audio/vide source is primarily a software with the ability to process the source clients video camera to separate the presenter (individual body parts, head, body, etc.) from his/her surrounding by either using actual 'green screen' or a software method to separate the video feeds foreground (presenter/participant) from the background (surrounding video footage). The client source side will compress the cropped and masked foreground video feed together with time synchronized audio data from the client sides microphone(s) to upstream them to the collaboration system platform, which will manage the forwarding of such video/audio streams to each participants client receive sides. The client source side #1 will also interpret an active presenter's gestures to determine intent and focus on shared presentation content, to allow automation on client receive side #4 for optimized presentation and arrangement flow. The #3 collaboration system platform is responsible to allow collaborating groups of two or more participants to setup a collaboration session and once setup, collect and manage the broadcasting of each presenter/participants content/video/audio contents. However, in special settings or where either bandwidth or processing capability restrictions exist on the client's sides or where the setting itself does not require or wants to restrict the clients influence on appearance/control over the clients side visual and audio representation, either client source #1 and/or client receive side #4 presenter/participant separation, masking and gesture processing could be tailored to be handled in the cloud system side #3, as well as the client receive visual arrangement management processing and correlating audio virtual space mapping. The #4 client receive side system is in general responsible for the management of visual presentation of the shared contents and manage the overlay of participants cropped/masked video feeds and creating the correlating audio space mapping, based on the systems (automated or manually controlled) relative positioning of presenter versus shared content or the client side user controlled choices of arranging the presenter(s)/participant(s) on his side of visual presentation.

Figure 1:
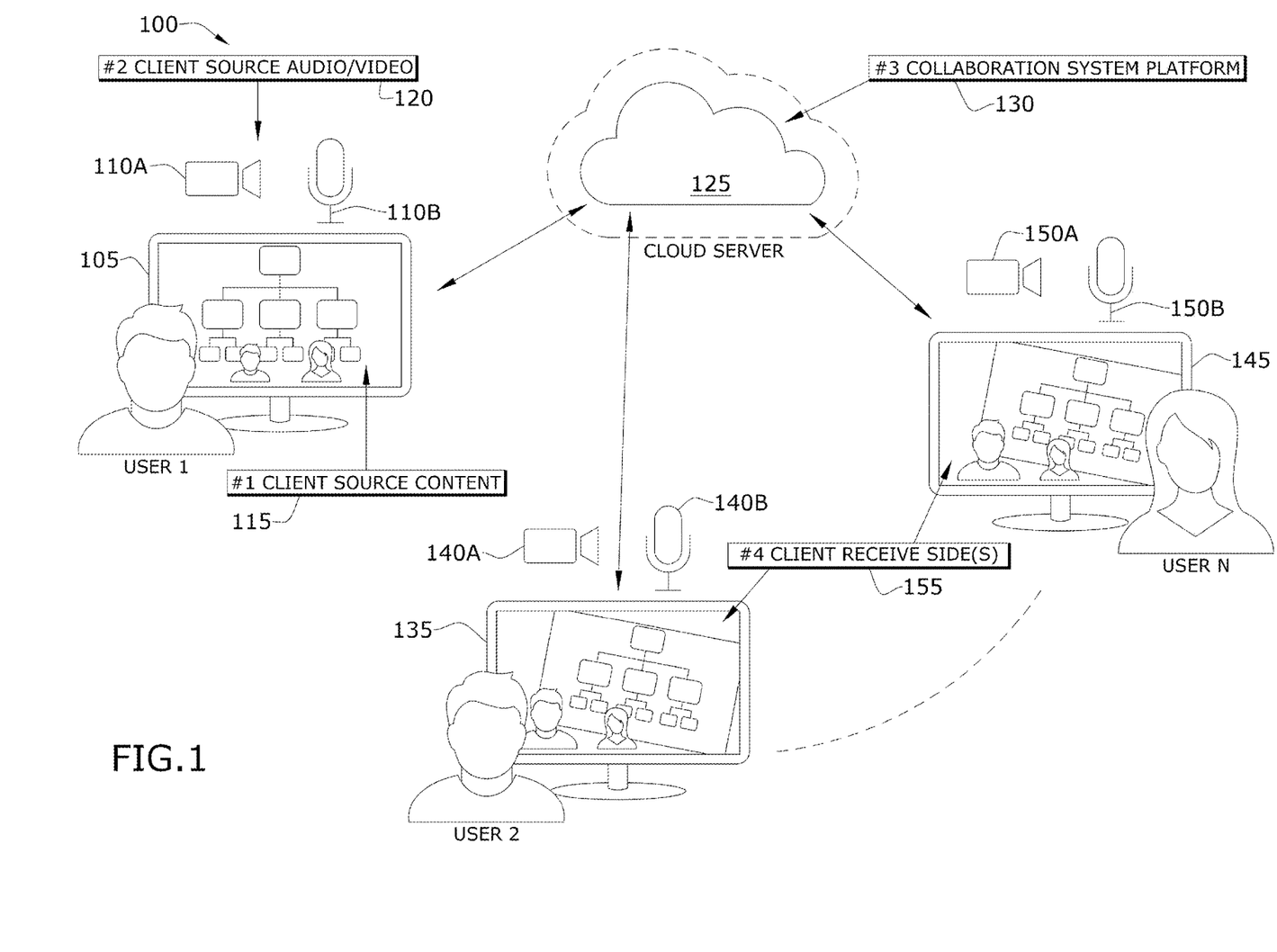
FIG. 1 conceptually illustrates a participant overlay and audio placement collaboration system platform in some embodiments.

By way of example, FIG. 1 conceptually illustrates a participant overlay and audio placement collaboration system platform 100. As shown in this figure, the participant overlay and audio placement collaboration system platform 100 includes a client source-side computing device 105, a client source-side video camera 110*a*, a client source-side microphone 110*b*, a client source-side shared content item 115, client source-side audio/video content 120, a cloud server 125, a cloud-based collaboration system platform 130, a first client receive-side computing device 135, a first client receive-side video camera 140*a*, a first client receive-side microphone 140*b*, a second client receive-side computing device 145, a second client receive-side video camera 150*a*, a second client receive-side microphone 150*b*, and a plurality of client receive-side content displays 155 on a plurality of client receive-side computing devices comprising at least the first client receive-side computing device 135 and the second client receive-side computing device 145.

In some embodiments, the cloud server 125 is a server computing device of the cloud-based collaboration system platform 130. In some embodiments, the cloud-based collaboration system platform 130 hosts a participant overlay and audio placement collaboration cloud service to which the client source-side computing device 105, the first client receive-side computing device 135, the second client receive-side computing device 145, and any other computing device among the plurality of client receive-side computing devices connect to share content and collaborate. In some embodiments, the cloud server 125 comprises a plurality of server computing devices of the cloud-based collaboration system platform 130. In some embodiments, the cloud-based collaboration system platform 130 further includes one or more cloud databases (not shown in this figure) that are communicably connected to the cloud server 125 and provide temporary and persistent storage of data transmitted between connected computing devices.

In some embodiments, the cloud server 125 of the cloud-based collaboration system platform 130 receives the client source-side shared content item 115 and the client source-side audio/video content 120 from the client source-side computing device 105. In some embodiments, the cloud server 125 performs source scene processing including video masking, audio linking, and screen sharing of the received client source-side shared content item 115 and the client source-side audio/video content 120.

Specifically, in some embodiments, the video camera and microphone of each computing device (i.e., the client source-side video camera 110a and the client source-side microphone 110b, the client receive-side video camera 140a and the client receive-side microphone 140b, and the client receive-side video camera 150a and the client receive-side microphone 150b) are combined together as a single video camera device that is capable of capturing both audio content and video content as a combined audio/video content stream of a scene which includes audio and video of the user (i.e., "USER 1", "USER 2", and "USER N", respectively) and the background scene, which is removed when received at the cloud server 125, in order to provide a moving image or video of each user minus the surrounding and background scene and to separately provide an audio stream, and (when the user is the source-side providing the shared content item) the client source-side content 115.

In this way, the client source-side shared content item 115 along with the moving image of "USER 1" can be distributed to any client receive-side computing device connected to the cloud-based collaboration system platform 130, such that "USER 1" can be overlayed on the client source-side content displayed on the first client receive-side computing device 135 associated with "USER 2" and the second client receive-side computing device 145 associated with "USER N". Similarly, the moving image of "USER 2" can be distributed to the client source-side computing device 105 for overlay on the client source-side shared content item 115, as well as distributed to the second client receive-side computing device 145 for overlay on the client source-side shared content item 115 displayed on the second client receive-side computing device 145. Likewise, the moving image of "USER N" can be distributed to the client source-side computing device 105 for overlay on the client source-side shared content item 115, as well as distributed to the first client receive-side computing device 135 for overlay on the client source-side shared content item 115 displayed on the first client receive-side computing device 135.

While the participant overlay and audio placement collaboration system platform 100 shown in this figure only illustrates two client receive-side computing devices namely, the first client receive-side computing device 135 and second client receive-side computing device 145 a person of ordinary skill in the relevant art would appreciate that any number of client receive-side computing devices can connect to the cloud server 125 of the cloud-based collaboration system platform 130. Furthermore, the client receive-side computing devices may alternately be considered as client source-side computing devices when and if they should be in position to provide shared content, in which case the client source-side computing device 105 would act as a client receive-side computing device.

Figure 2:
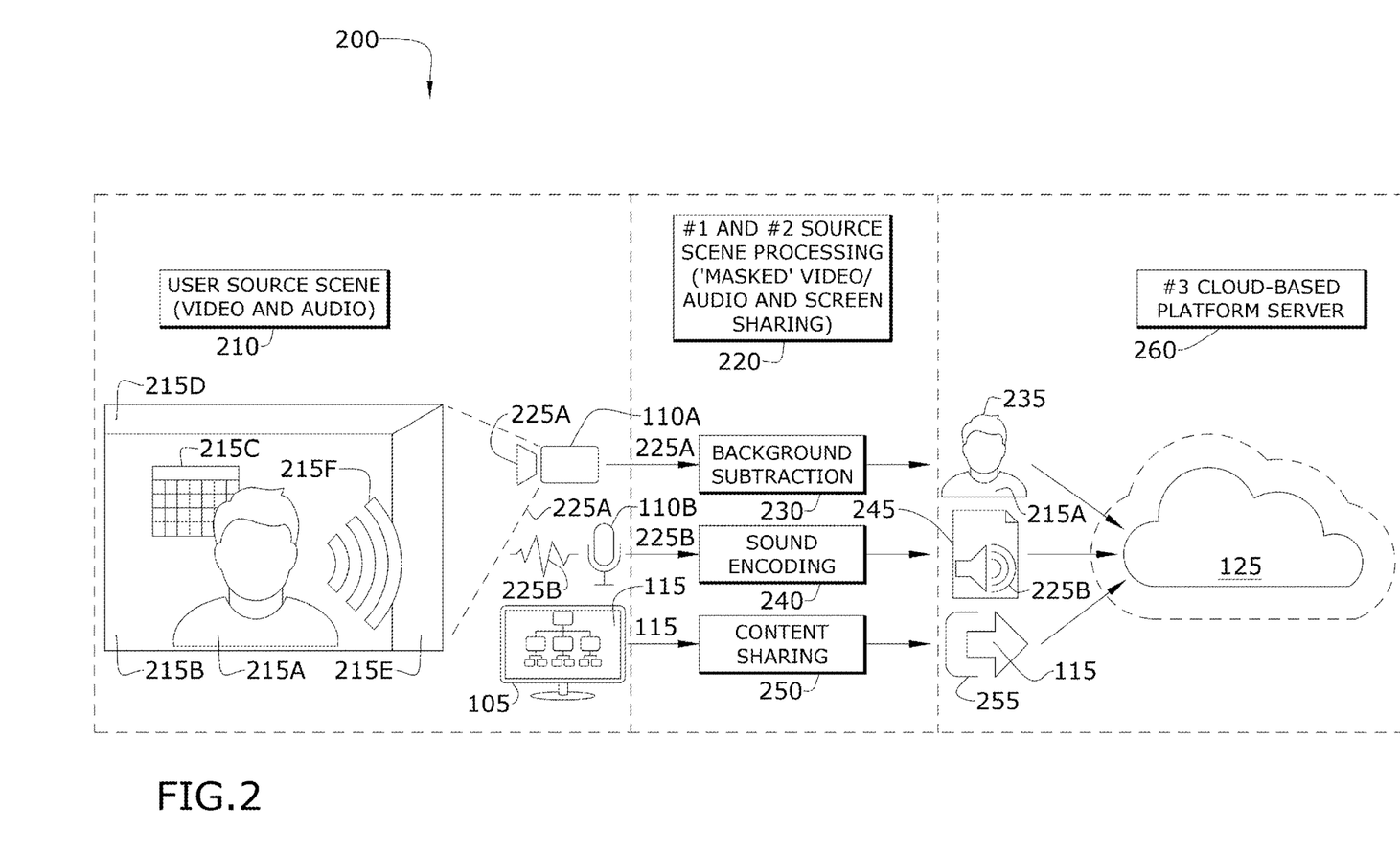
FIG. 2 conceptually illustrates a client collaboration source-side method for overlaying participants collaborating via a user interface and representational placement of distinct audio sources as isolated participants in some embodiments.

By way of example, FIG. 2 conceptually illustrates a client collaboration source-side method 200 for overlaying participants collaborating via a user interface and representational placement of distinct audio sources as isolated participants. As shown in this figure, the client collaboration source-side method 200 includes three phases, namely, a user source scene phase 210 in which video and audio is captured and content is shared, a source scene processing phase 220 in which captured audio and video from the user source scene phase 210 is processed and content is prepared for sharing, and a cloud-based platform server phase 260 in which the processed vide and audio is prepared for distribution to client receive-side computing devices to overlay on the shared content.

Specifically, during the user source scene phase 210, a first user 215a is present in a room 215b with a calendar 215c positioned behind the first user 215a below a ceiling 215d of the room 215b. The room 215b also includes a side wall 215e that is in a field of view 225a of the video camera 110a, which is capturing video in the field of view 225a, while the microphone 110b captures audio sound 225b of the first user 215a speaking 215f (or otherwise making audible sound 215l). The client source-side computing device 105 displays the client source-side shared content item 115 which the first user 215a has selected to share for collaboration with other users.

During the source scene processing phase 220, the captured video 225a, the captured audio 225b, and the client source-side shared content item 115 undergo source scene processing, which includes background subtraction 230, sound encoding 240, and content sharing 250. Specifically, background subtraction 230 involves processing of the captured video 225a to remove video artifacts representing the room 215b, the calendar 215c, the ceiling 215d, and the side wall 215e from the scene, leaving the first user 215a untouched. The result of performing background subtraction 230 on the captured video 225a is a first user only video 235. The sound encoding 240 that is performed on the captured audio 225b results in a processed audio stream 245 that is linked to the first user only video 235 and which sounds like the sound of the captured audio 225b, Finally, the content sharing 250 is performed to prepare the client source-side shared content item 115 as a shared content item 255 for any client receive-side computing device to display with overlays of the user-only videos and associated audio.

During the cloud-based platform server phase 260, the first user only video 235, the processed audio stream 245, and the shared content item 255 are uploaded to the cloud server 125 and made available on the cloud-based collaboration system platform 130 for distribution to client receive-side computing devices.

Figure 3:
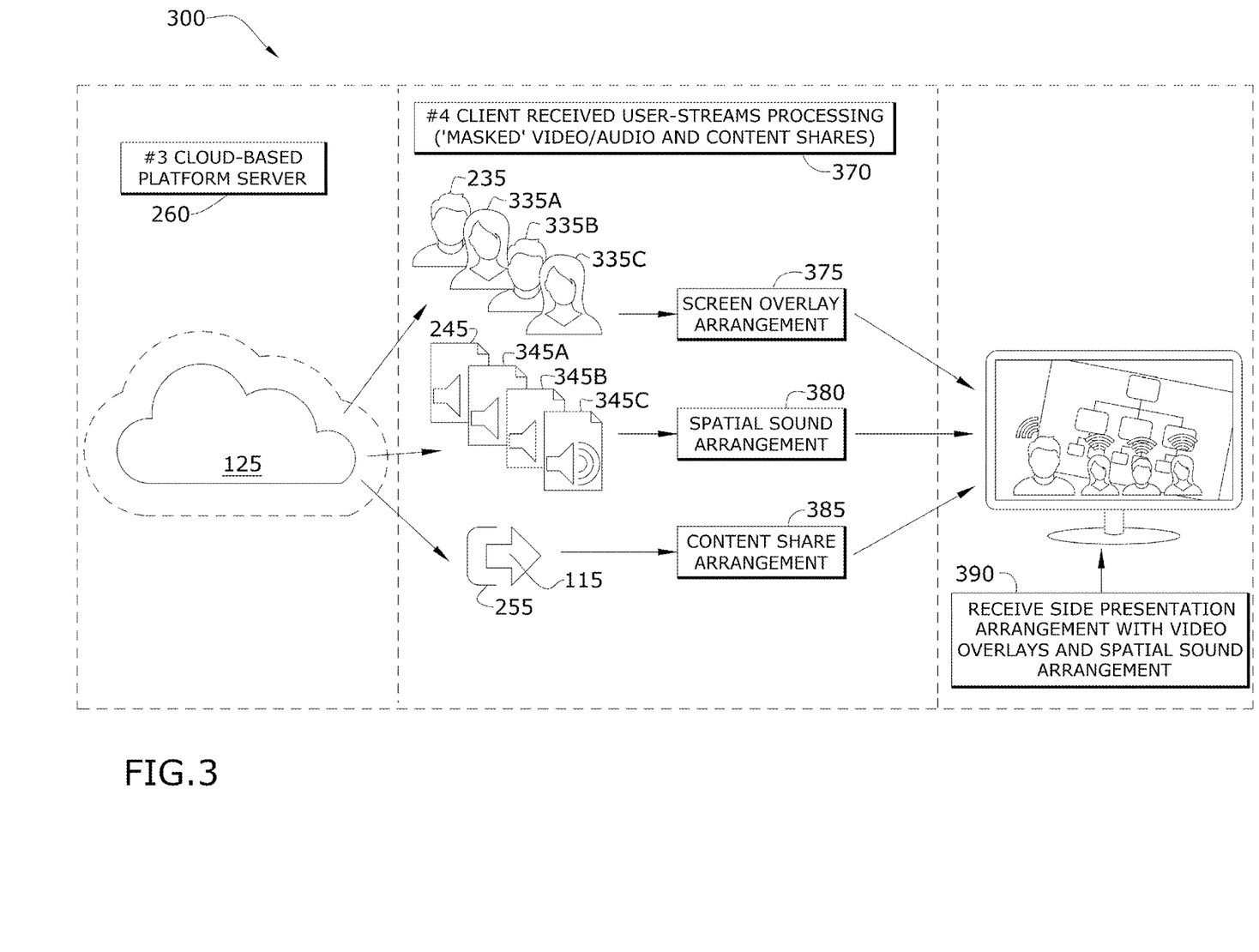
FIG. 3 conceptually illustrates a client collaboration receive-side method for overlaying participants collaborating via a user interface and representational placement of distinct audio sources as isolated participants in some embodiments.

Continuing in another example, FIG. 3 conceptually illustrates a client collaboration receive-side method 300 for overlaying participants collaborating via a user interface and representational placement of distinct audio sources as isolated participants. As shown in this figure, the client collaboration receive-side method 300 includes three phases, namely, the cloud-based platform server phase 260 described above by reference to FIG. 2, a masked video/audio and content share phase 370, and a receive-side presentation arrangement phase 390. While the cloud-based collaboration system platform 130 makes the shared content item 255 (with the client source-side shared content item 115 which the first user 215a had previously selected to share for collaboration with other users) available, a notable addition is that in addition to the first user only video 235 and the processed audio stream 245 of the first user 215a, other users also upload their own user-only videos and processed audio streams. Specifically, a second user only video 335A and second user processed audio stream 345A, a third user only video 335B and third user processed audio stream 345B, and a fourth user only video 335C and fourth user processed audio stream 345C are uploaded to the cloud server 125 and made available by the cloud-based collaboration system platform 130 for distribution to client receive-side computing devices (which in this case is all of the user computing devices for the first user 215a, the second user, the third user, and the fourth user).

Thus, during the masked video/audio and content share phase 370, screen overlay arrangement 375 is performed in connection with the first user only video 235, the second user only video 335A, the third user only video 335B, and the fourth user only video 335C. Also during the masked video/audio and content share phase 370, spatial sound arrangement 380 is performed in connection with the processed audio stream 245 of the first user 215a, the second user processed audio stream 345A, the third user processed audio stream 345B, and the fourth user processed audio stream 345C, The other processing performed during the masked video/audio and content share phase 370 is content share arrangement 385. Ultimately, the arrangements made during the masked video/audio and content share phase 370 result in the receive side presentation arrangement with video overlays and spatial sound arrangement during the receive-side presentation arrangement phase 390 (with respect to the computing device of each user collaborating via the cloud-based collaboration system platform 130).

To make the participant overlay and audio placement collaboration system platform and method for overlaying participants collaborating via a user interface and representational placement of distinct audio sources as isolated participants of the present disclosure, the client source content sharing performs periodic screen captures of the client device desktop (computer, tablet, phone, TV or other "smart" communication device) and assembles/compresses the resulting data stream to be shared/transmitted over network interfaces to the cloud based system platform. The client source side audio/video uses the client device video and audio sources (cameras and microphones) and actual or virtual 'green screening' technology by either chroma-keying/filtering a certain background color ('green screen') or more intelligent and adaptive, model or artificial intelligence based algorithms to separate and mask the active participants video content (head, body etc.) from the irrelevant background. The masking occurs by cropping the video to the relevant video content size and masking the remaining unnecessary background pixels, using the 'alpha channel' of embedded video or creating a separate masking video stream, describing each pixel 'transparency', by assigning transparency to pixel correlating with background, just leaving the presenter's body and contour as non-transparent (opaque) content.

Further standard video compression and transmission over network feeds the resulting video and synchronized audio stream to the collaboration system platform cloud servers for further distribution. Parallel to the masking and cropping, gesture recognition algorithms will determine the presenter(s) orientation, face, arm and hand movements (if needed any other relevant body parts movement also) and transmit these as time synchronized embedded attributes with the video and audio stream. The collaboration system platform is a state of the art cloud bases software, residing on server farms like Amazon Web Services (AWS) or similar, allowing two or more users to spawn of collaboration sessions. The client receive side decompresses content, cropped/masked video/audio streams and displays/overlays those on the user output devices. In the optimal setup the client source side allows for all processing and cropping/masking of each clients individual participants video/audio/gesture content, providing preprocessed feeds to the cloud system platforms, which would just have to route those feeds to the client receive sides that would be responsible for the decompression, further processing and arrangement of all content/video/audio feeds to create the maximized presentation content, with overlay of presenters/participants and creation of the correlating audio-space for a dynamic, adaptive and user-friendly experience. In bandwidth limited, processing limited client setups or in settings with less need for client receive side flexibility or desire to control client receive side experience, either the client source side processing of video cropping/masking/gesture recognition, as well as the client receive side content/video/audio/gesture processing and adaptations could reside and be part of the cloud based system platform and perform on the central server rather than the client devices.

The general processing and data flow is identical, but the allocation of processing resources can be adapted to reside in the clients or the central cloud system. The creation of the audio-space, creating a virtual audio space correlating with the visual presentation of content and presenter/participants is generally optional for optimized and most immersive experience. If either by limit of client performance or the users choice of disabling this feature, is not mandatory for the proposed system, but would enhance the end-user experience. Also, the choice of method to realize the 'green screening' is a pure matter of available processing performance on the client system and a matter of convenience and the resulting performance and accuracy to achieve the same things. The mythology chosen is not relevant to the overall concept of the collaboration system concept. The allocation of client source and receive processing, being located either on the clients themselves or realized as spawned processes in the cloud system, is generally variable and can be adapted to the collaboration venues need. Also the client system, while typically being a personal computer or mobile device, can be anything from a smart TV set, in car/bus/airplane video communication device, smart TV set, public address video boards, school or other educational 'class room' settings, conference settings etc., anything from a one-to-one to multiple-to-multiple settings, from few to thousands of clients.

Embodiments of the participant overlay and audio placement collaboration system platform and method for overlaying participants collaborating via a user interface and representational placement of distinct audio sources as isolated participants described in this specification differ from and improve upon currently existing options. In particular, some embodiments differ by using the 'green screen' method to separate presenters/participants video feeds and overlaying them to shared/presented contents, which allows for a much larger presentation of relevant contents on the limited available desktop space, while allowing for a more immersive presentation through 'interaction' with the presented material. Also, the corresponding audio representation of speakers/participants arrangements on the users screen, support a much improved comprehensibility of the presented content, by acoustically separating speakers in a virtual audio space, correlating to the participants visual arrangement on the users screen.

In addition, some embodiments of the participant overlay and audio placement collaboration system platform and method for overlaying participants collaborating via a user interface and representational placement of distinct audio sources as isolated participants improve upon the currently existing options because of the separation of shared contents versus video feeds in the existing collaboration systems requires switching or prioritizing (by user or software) how much of the shared contents or of the participants video feeds will be shown to the receivers at one point in time, to either allow good content sharing with the limited to no presenter visualization or to show more of the presenters but then compromising the visualization of the shared content. Furthermore, the down mixing of all participants' audio sources to one common audio feed prevents localization of speakers acoustically by listeners, which prevents the participants from being able to separate different speakers from each other or separate speakers from background noises. In contrast, the participant overlay and audio placement collaboration system platform and method for overlaying participants collaborating via a user interface and representational placement of distinct audio sources as isolated participants of the present disclosure separates presenters/speakers relevant video contents from the irrelevant surrounding and visually overlays the presenter with the presented material to provide a more immersive and interactive presentation and to maximize use desktop space. The correlation of audio-mapping of acoustic content of presenter(s)/participant(s) relative to their appearance on the desktop, allows for a significantly improved audio experience and separation capability of different speakers and relevant speakers audio from nuisance background sounds.

In short, the participant overlay and audio placement collaboration system platform allows for a more immersive and intuitive interaction and collaboration with peers than any other existing collaboration platform. In addition, the participant overlay and audio placement collaboration system goes beyond this by allowing presenters to interact with shared content and/or allowing presenters to interact with each other while enabling the users more immersive and natural perception of presenters and their contents and maximizing focus on the intended presentation content with optimized ability for the presenter and for each receiver/viewer, as embedded in the audio-visual representation.

To use the participant overlay and audio placement collaboration system platform and method for overlaying participants collaborating via a user interface and representational placement of distinct audio sources as isolated participants of the present disclosure, there is great flexibility from one-to-one settings of two users sharing contents and their individual appearance as visually output to each other's client devices, allowing themselves to be overlaid with the receiving clients desktop information or shared content. Furthermore, the participant overlay and audio placement collaboration system platform and method for overlaying participants collaborating via a user interface and representational placement of distinct audio sources as isolated participants supports all these features and functions for complex multi-user, multi-presenter collaboration sessions, where each client can have individual representations of the share content as well as individualized overlays and interaction of presenters/participants with the client receive side desktops or the shared contents.

Additionally, while the participant overlay and audio placement collaboration system platform is primarily designed for online and realtime direct people interaction and audio-visual immersive composition of shared content and users, the participant overlay and audio placement collaboration system platform can also be used to improve or optimize other forms of communication, media, or services. For example, the participant overlay and audio placement collaboration system platform can be used to create interactive TV shows, automated or non-interactive advertising systems, new social interaction platforms, etc. As such, the participant overlay and audio placement collaboration system platform could be adapted for use in creating and supporting create interactive media content, advertising material, scholarly or other shared educational content, new feeds, music venues, new online game play platforms, etc.

The above-described embodiments of the invention are presented for purposes of illustration and not of limitation. While these embodiments of the invention have been described with reference to numerous specific details, such as software implementations of the system and processes, one of ordinary skill in the art will recognize that the invention can be embodied in other specific forms without departing from the spirit of the invention. Thus, in this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any, combination of separate programs that together implement a software invention described here is within the scope of the invention. In some embodiments, the software programs, when installed to operate on one or more electronic systems, define one or more specific machine implementations that execute and perform the operations of the software programs.

Figure 4:
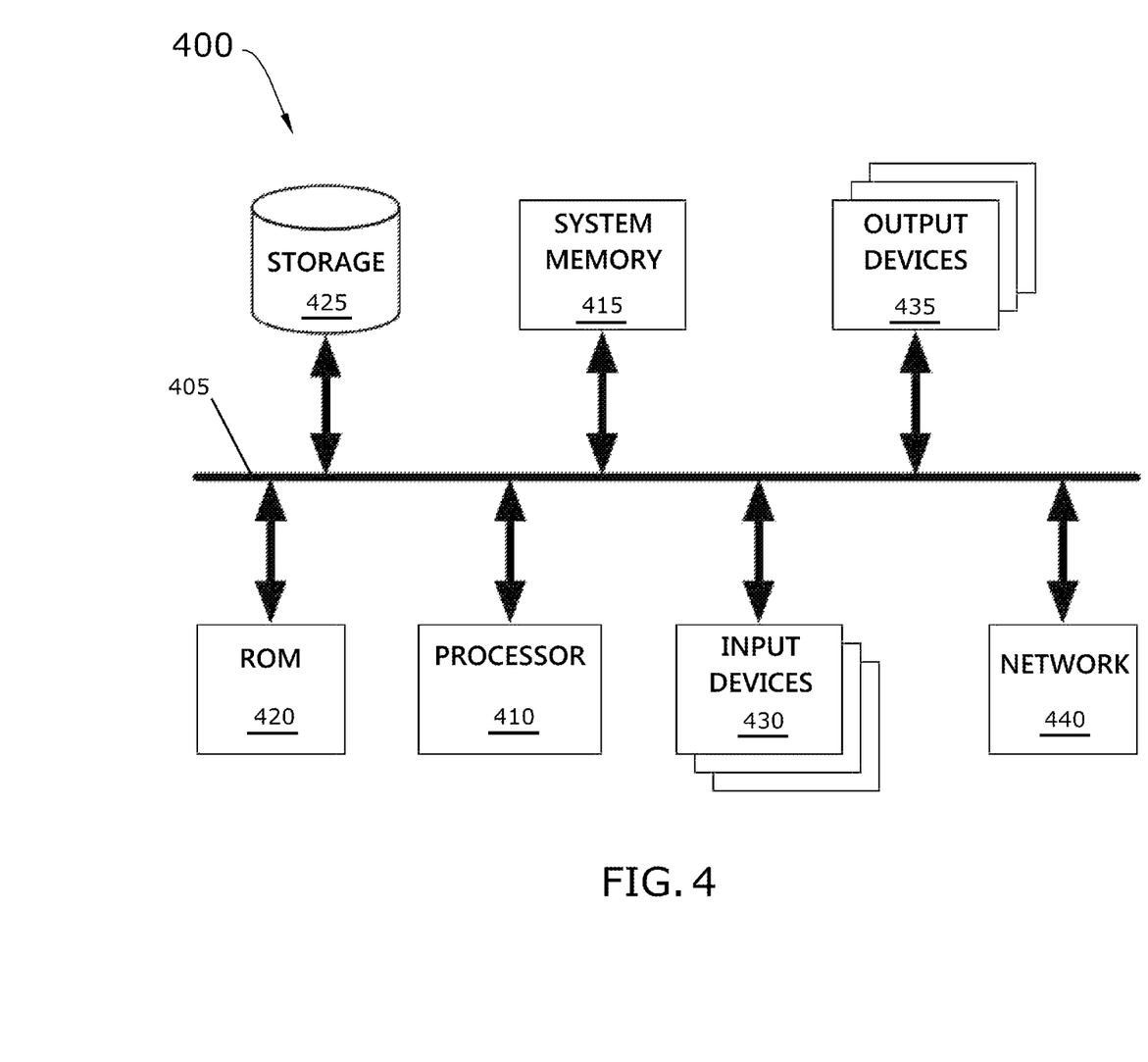
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer, phone (such as a mobile device, a smartphone, etc.), a tablet computing device, a PDA (a non-phone smart digital assistant, etc.), any variety of in-car computer or computational-communication device, or any other sort of electronic device. Such an electronic system includes various types of computer readable media and interfaces for various other types of computer readable media. Electronic system 400 includes a bus 405, processing unit(s) 410, a system memory 415, a read-only 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device.

However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only 420. For example, the various memory units include instructions for processing appearance alterations of displayable characters in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display images generated by the electronic system 400. The output devices 435 include printers and display devices, such as cathode ray tubes (CRT), liquid crystal displays (LCD), organic light emitting diode displays (OLED). Some embodiments include devices such as a touch-sensitive screen ("touchscreen") that functions as both an input device and an output device (visual output).

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, RUM, read-only compact discs (CD-ROM), recordable compact discs (CD-R), rewritable compact discs (CD-RW), read-only digital versatile discs (e.g., DVD-RUM, dual-layer DVD-ROM), a variety of recordable/rewritable DVDs (e.g., DVD-RAM, DVD-RW, DVD+RW, etc.), flash memory and/or flash drives (e.g., SD cards, mini-SD cards, micro-SD cards, etc.), RAM chips, hard drives, magnetic and/or solid state hard drives, EPROMs, read-only and recordable Blu-Ray® discs, ultra density optical discs, any other optical or magnetic media, etc. The computer-readable media may store a computer program that is executable by at least one processing unit and includes sets of instructions for performing various operations. When these instructions are executed by one or more processing unit(s) (e.g., one or more processors, cores of processors, or other processing units), they cause the processing unit(s) to perform the actions indicated in the instructions. The computer readable media does not include carrier waves and electronic signals passing wirelessly or over wired connections. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 2-3 conceptually illustrates processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process (one combined process). Thus, one of ordinary skill in the art would understand that the invention is not to be limited by the foregoing illustrative details, but rather is to be defined by the appended claims.

I claim:

1. A participant overlay and placement collaboration system platform comprising:
    a client source-side video camera that captures source scene video of a scene within a field of view of the client source-side video camera, wherein the scene includes a background and a foreground with a first user;
    a client source-side computing device that receives the source scene video of the scene from the client source-side video camera and renders a first user only video that represents the first user in a collaborative audio/visual presentation as an isolated video representation of the first user, wherein the first user only video is rendered after source scene processing that includes background subtraction from the source scene video of the scene;
    a client receive-side computing device that overlays isolated video representations of users in the collaborative audio/visual presentation; and
    a cloud-based collaboration system platform comprising a participant overlay and audio placement collaboration server to which the client source-side computing device and the client receive-side computing device connect to share content and collaborate in relation to the collaborative audio/visual presentation, wherein the participant overlay and audio placement collaboration server receives the first user only video from the client source-side computing device and distributes the first user only video as the isolated video representation of the first user to the client receive-side computing device, wherein the participant overlay and audio placement collaboration server is a cloud-based server that hosts a participant overlay and audio placement collaboration cloud application software-as-a-service (SaaS service).

2. The participant overlay and placement collaboration system platform of claim 1 further comprising:
    a participant visual isolation module that performs preprocessing and isolates audio associated with isolated video representations of users in the collaborative audio/visual presentation;
    an audio/visual isolation and relation module that links the isolated video representation of each user to a corresponding isolated audio channel for the user; and a user participant audio/visual collaboration system target client compute module that receives information from the audio/visual isolation and relation module to spatially represent the isolated video representations of users in a visual layout for the collaborative audio/visual presentation.

3. The participant overlay and placement collaboration system platform of claim 2 further comprising:
an audio placement compute module that separates audible sound content from individual isolated video representations of users in the collaborative audio/visual presentation and maps the separated audible sound content to the corresponding isolated audio channel linked to the isolated video representation for the user according to the visual layout.

4. The participant overlay and audio placement collaboration system platform of claim 3, wherein the audio placement compute module is an audio placement cloud compute module that runs as a service layer of the participant overlay and audio placement collaboration cloud application SaaS service.

5. The participant overlay and placement collaboration system platform of claim 3, wherein the user participant audio/visual collaboration system target client compute module further receives information from the audio/visual isolation and relation module to direct audio output to an audio channel associated with a relative spatial area placement that corresponds with the isolated visual representation of a user providing audio.

6. The participant overlay and placement collaboration system platform of claim 2, wherein the audio/visual isolation and relation module runs on the client source-side computing device and uploads the linked isolated video representation of the first user and the corresponding isolated audio channel to the participant overlay and audio placement collaboration cloud application SaaS service hosted by the cloud-based participant overlay and audio placement collaboration server.

7. A non-transitory computer readable medium storing a program which, when executed by a processor of a computing device, overlays participant video associated with users collaborating on shared content via a user interface, said program comprising sets of instructions for:
capturing a user source scene video for each user in a plurality of users participating in a collaborative presentation, wherein each user in the plurality of users operates a computing device that connects to a network service that interconnects the plurality of users participating in the collaborative presentation;
receiving a content item selection from a particular user in the plurality of users;
performing a plurality of source scene processing operations on the user source scene video for each user in the plurality of users participating in the collaborative presentation, wherein the plurality of source scene processing operations comprises at least a background subtraction operation that removes a background scene from the user source scene video for each user in the plurality of users and renders a user only video that visually represents the user in a collaborative presentation user interface (UI) to share content and collaborate during the collaborative presentation;
preparing the received content item as a shared content item to share by the plurality of users during the collaborative presentation; and
visually presenting, on a screen of the computing device for each user in the plurality of users, the shared content item in the collaborative presentation UI with overlays of the user only videos that represent the plurality of users participating in the collaborative presentation, wherein the shared content item and the overlays of the user only videos are visually presented in a separate layout for each user in the collaborative presentation UI, wherein the layout for each user in the plurality of users participating in the collaborative presentation is adjustable by movements of the user only videos in the collaborative presentation UI and are visually presented differently when the users adjust the locations in the layout of the user only videos.

8. The non-transitory computer readable medium of claim 7, wherein the program further comprises a set of instructions for capturing a user source scene audio for each user in the plurality of users participating in the collaborative presentation, wherein the set of instructions for performing the plurality of source scene processing operations on the user source scene video further comprises a set of instructions for performing the plurality of source scene processing operations on both the user source scene video and the user source scene audio for each user in the plurality of users participating in the collaborative presentation, wherein the set of instructions for visually presenting the shared content item in the collaborative presentation UI with overlays of the user only videos further comprises a set of instructions for presenting the shared content item in the collaborative presentation UI with mappings of an audio channel for the processed user source scene audio for each user in the plurality of users participating in the collaborative presentation.

9. The non-transitory computer readable medium of claim 8, wherein the plurality of source scene processing operations further comprises a sound encoding operation that maps the audio channel to the user only video for each user in the plurality of users participating in the collaborative presentation, wherein the mapped audio channel emits sound from a relative location that corresponds to the locations of the user only videos in each separate layout for the plurality of users as visually presented in the collaborative presentation UI.

10. The non-transitory computer readable medium of claim 9, wherein the program further comprises a set of instructions for performing spatial sound arrangement of a plurality of user source scene audio channels that are connected to the plurality of user only videos at the network service, said spatial sound arrangement mapping the arrangement of the user only videos to the location of the corresponding user source scene audio.

\* \* \* \* \*